United States Patent [19]

Takahashi et al.

[11] Patent Number: 4,707,057

[45] Date of Patent: Nov. 17, 1987

[54] OPTICAL SWITCHING UNIT

[75] Inventors: Fumitaka Takahashi, Tokyo; Yoshihiko Kimura; Hideo Tsubata, both of Saitama; Nobuaki Ohji; Kiyoshi Sashida, both of Saitama, all of Japan

[73] Assignee: Honda Giken Kogyo Kabushiki Kaisha, Tokyo, Japan

[21] Appl. No.: 631,851

[22] Filed: Jul. 18, 1984

[30] Foreign Application Priority Data

Jul. 21, 1983 [JP] Japan ................................ 58-133130
Feb. 15, 1984 [JP] Japan ................................ 59-26693

[51] Int. Cl.$^4$ ................................................ G02B 6/12
[52] U.S. Cl. ................................ 350/96.12; 350/96.14
[58] Field of Search ............... 350/96.10, 96.12, 96.13, 350/96.15, 96.16

[56] References Cited

U.S. PATENT DOCUMENTS

| | | | |
|---|---|---|---|
| 3,943,358 | 3/1976 | Reymond et al. | 350/96.10 X |
| 4,112,293 | 9/1978 | Kach | 350/96.16 X |
| 4,148,558 | 4/1979 | Schuck | 350/96.20 |
| 4,166,946 | 9/1979 | Chown et al. | 350/96.16 X |
| 4,246,475 | 1/1981 | Altman | 350/96.15 X |
| 4,406,513 | 9/1983 | Raphael | 350/96.16 |
| 4,557,550 | 12/1985 | Beals et al. | 350/96.16 X |

*Primary Examiner*—William L. Sikes
*Assistant Examiner*—Akm E. Ullah
*Attorney, Agent, or Firm*—Irving M. Weiner; Joseph P. Carrier; Pamela S. Burt

[57] ABSTRACT

An optical switching unit including mechanisms for receiving a beam of light consisting of a plurality of component rays of different wavelengths, separating the light by making use of the reflection characteristic of suitable spectroscopic elements into the component rays to be lead to corresponding light-conductive paths, selecting either the interruption or transmission of the component rays by means of light-shielding plates provided in the respective light-conductive paths, and collecting the components rays to again compose a composite ray of the beam of light to be let out.

The respective light-conductive paths are connected in parallel and have their light-separating branched portions arranged in series. In each of the branched portions is disposed a corresponding one of the spectroscopic elements, which corresponding one has its reflection characteristic reflectable of a corresponding component ray and a component ray reflectable by at least a one-stage preceding spectroscopic element.

12 Claims, 9 Drawing Figures

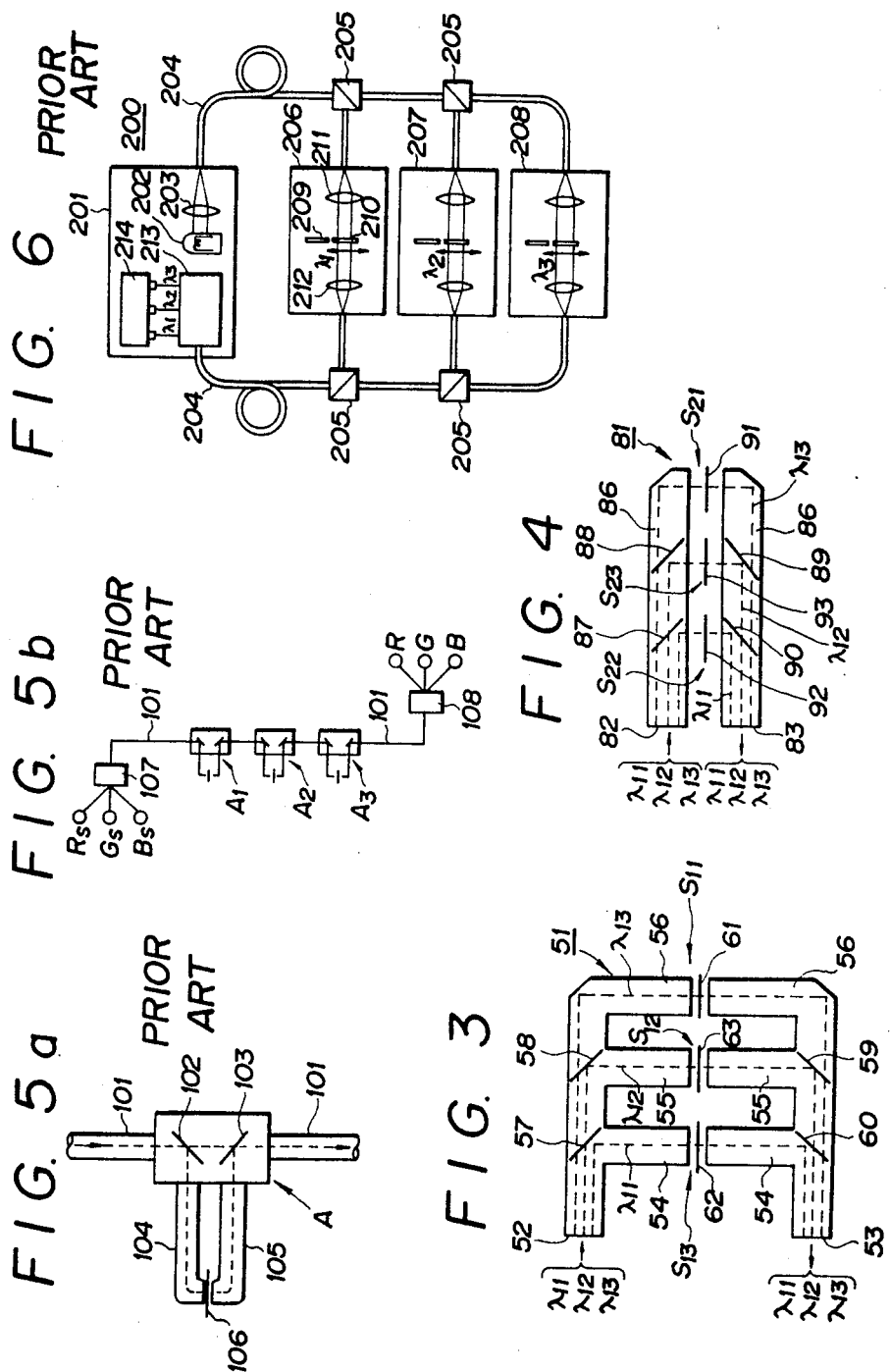

OPTICAL SWITCHING UNIT

BACKGROUND OF THE INVENTION

1. Field of the Invention

The present invention relates to an optical switching unit including a plurality of optical switches.

2. Description of Relevant Art

In recent years, as a new type of signal transfer system, there has been proposed an optical transfer system, in which an optical fiber for the transfer of a beam of light consisting of a plurality of component rays of different wavelengths is employed as a transfer cable. Particularly, as an example of implementation of such optical transfer system, there is known an optical detection system with an optical switch element disposed in the route of the transfer cable.

As an example of such optical switch element, in Japanese Patent Laid Open No. SHO 56-8103 (1981), there is proposed an optical switch of such constitution as shown in FIGS. 5a and 5b of the accompanying drawings.

As shown in FIG. 5a, the optical switch designated at reference character A includes a branching device 102 positioned in the route of a main optical fiber 101 for transfer service, the device 102 consisting of a spectroscopic element for extracting or reflecting a component ray of particular wavelength and transmitting other component rays of light, a pair of optical fibers 104, 105 constituting a light-conductive bypass for transferring the reflected ray of light, a light-shielding plate 106 interposed between the respective confronting end faces of the optical fibers 104, 105, and a joining device 103 consisting of a spectroscopic element for reflecting only the component ray of particular wavelength transferred through the optical fibers 104, 105 and transmitting other component rays of light.

The branching device 102 is composed of an interference filter, a diffraction grating, or a prism, while the joining device 103 is composed of a half mirror or an interference filter. Moreover, the light-shielding plate 106 consists of a plunger actuatable such as by a solenoid.

The component ray of particular wavelength transferred through the optical fiber 101 is thus interruptable by the shielding plate 106. The optical switch A is permitted to detect the state of movement of the plate 106 by detecting the existence of the ray of particular wavelength at the outlet side of the optical fiber 101.

The optical switch A is applicable to a detection system such as shown FIG. 5b. Namely, the optical fiber 101 employed in the form of an optical cable is provided at the light source end thereof with three light sources Rs, Gs, Bs generating red, green, and blue colors, respectively, and a joining device 107 for composing a composite ray of light from the rays of light generated at the light sources Rs, Gs, Bs and feeding the composite ray to the optical cable 101. Moreover, in the route of the optical cable 101, there is provided three optical switches A1, A2, A3 connected in series and each respectively adapted to interrupt no more than one of the component rays as generated to be conducted from the light sources Rs, Gs, Bs. Also, the optical cable 101 has at the detection-element end thereof a joining device 108 for separating the transferred composite ray of light into the three components of red, green, and blue colors.

In the above-mentioned system, the optical switches A1, A2, A3 have their light-shielding plates each respectively adapted to selectively take "on" and "off" positions in response to the condition object to be detected. As a result, the optical switches A1, A2, A3 are permitted to sense a quantity of a state of the object, such as electronic current, voltage, temperature, and pressure. As a matter of course the optical switches A1, A2, A3 can be employed purely as on-off switches.

An example of such system is proposed in Japanese Patent Laid-Open No. SHO 56-149840 (1981), which discloses an optical detection system of such a constitution as shown in FIG. 6 of the accompany drawings.

In FIG. 6, designated at reference numeral 200 is the optical detection system, which is adapted for the detection of the on-off state of the switch of a plurality of terminal devices, while having substantially the same use as the detection system of FIG. 5b.

The optical detection system 200 includes a main device 201 having therein a light source 202 composed such as of a tungsten halogen lamp generating a continuous emission spectrum and a converging lens 203, an optical cable 204 adapted for light transfer between the main device 201 and the terminal devices 206, 207, 208, two pairs of reflectors 205 such as half mirrors for distributing component rays from the optical cable 204 to the terminal devices 206, 207, 208 and composing a composite ray of light by the component rays from the terminal devices 206, 207, 208, and a combination of branching filters 213 and an array of light-receiving elements 214 arranged in the main device 201 and adapted for the analysis of the composite ray conducted through the optical cable 204.

The terminal device 206 consists of a collimeter lens 211 for changing a component ray from the optical cable 204 into a flux of parallel rays, a converging lens 212 for leading the light flux from the collimeter lens 211 to the optical cable 204, a filter plate 210 interposed between the collimeter lens 211 and the converging lens 212, the filter plate 210 transmitting no more than a component ray of wavelength $\lambda_1$, and a light-shielding plate 209 cooperating with the filter plate 210. At the terminal device 206, when the quantity of the state to be detected is in an "on" phase thereof, the filter plate 210 is positioned between lenses 211, 212 and, when it is in an "off" phase, the light-shielding plate 209 is positioned therebetween. Therefore, the terminal device 206 transmits, when such quantity is in the "on" phase, only the component ray of wavelength $\lambda_1$ and, when it is in the "off" phase, no ray of light whatsoever. The constitution and function of other terminal devices 207, 208 are substantially the same as those of the terminal device 206, while respective component rays of light to be transmitted in their "on" phases are of wavelengths $\lambda_2$, $\lambda_3$, respectively.

In the above-mentioned detection system, for each terminal device, the quantity of the state to be "on" or "off" is detected by analyzing or detecting the component rays in the composite ray from the terminal device, with the branching filters 213 and the array of light-receiving elements.

In the foregoing two prior art optical switching and detection systems, an optical fiber or cable which is not an electrical conductor and free from electrical disturbances favorably permits the achievement of a detection system high in reliability with respect to noise, in comparison with a conventional detection system using an electric signal requiring shielding of an electric cable susceptible to noise.

Incidentally, with respect to the above two prior art systems, when comparing optical switches or certain members corresponding thereto, it will be understood that the optical switch according to the prior art example illustrated in FIG. 5b has a smaller number of component parts needed per the number of objects to be detected.

However, the optical switch of FIG. 5b has such problems as explained below.

The detection system illustrated in FIG. 5b has its optical switch portion schematized and its three light sources are assumed to be of three component rays of wavelengths $\lambda_1, \lambda_2, \lambda_3$ ($\lambda_1 < \lambda_2 < \lambda_3$), thereby obtaining a model shown in FIG. 7.

In FIG. 7, in addition to the optical switch A1, two optical switches A2 and A3 have respective spectroscopic elements 112, 113 and 122, 123, light-conductive bypasses 114, 115 and 124, 125, and light-shielding plates 116 and 126.

In the model of FIG. 7, the respective optical switches A1, A2, A3 are arranged in series along an optical transfer path of the optical cable 111, thus requiring, for separating the composite ray of light into respective component rays corresponding to the optical switches A1, A2, A3, the respective spectroscopic elements 102, 103; 112, 113; 122, 123 to have their filtration (reflection) characteristics selected so as to extract no more than respective component rays of corresponding wavelengths independently thereamong.

Accordingly, as shown in FIG. 8, the component rays of wavelengths $\lambda_1, \lambda_2, \lambda_3$ are required to have their emission spectra (shadowed regions) covered by no more than respective reflection spectra B1, B2, B3 of corresponding electroscopic elements 102, 103; 112, 113; 122, 123, thus allowing no overlapping between respective pairs of neighboring reflection spectra B1, B2 and B2, B3. In other words, the case where, for example, the spectroscopic element 112 reflects the component ray of wavelength $\lambda_1$ as well as that of wavelength $\lambda_2$, the former ray is unable to avoid being subject to the interruption of both optical switches A1, A2, thus resulting in an erroneous detection of the on-off state of the light-shielding plate 106.

As a result, assuming the respective reflection spectra B1, B2, B3 of the optical switches A1, A2, A3 to be all of a predetermined wavelength band, the wavelengths $\lambda_1, \lambda_2, \lambda_3$ of component rays must be selected to be spaced apart at intervals not smaller than the predetermined band width. Therefore, a predetermined total wavelength region of the optical transfer route 101 restricts to a considerable extent the degree of wavelength multiplication or the number of applicable optical switches. Further, the conventional limit switch is not normally assembled in a unit, thus being inconvenient.

The present invention has been achieved to effectively overcome the foregoing problems of conventional optical switches as applied to an optical detection system.

SUMMARY OF THE INVENTION

According to the present invention, there is provided an optical switching unit comprising a main light-conductive path having a light inlet for intaking a composite ray of light consisting of a plurality of component rays of predetermined wavelengths from a light source and a light outlet for outputting the composite ray. A first gap is formed in the route of the main light-conductive path, the first gap dividing the main light-conductive path. A first light-shielding member is adapted to be actuated to be inserted in the first gap by an actuation means in accordance with the state of a first detection object. A first spectroscopic element is provided for reflecting a component ray of a first predetermined wave-length in the composite ray, the first spectroscopic element being disposed in the main light-conductive path between the light inlet and the first gap, and having a first reflection wavelength band including the first predetermined wavelength. A second spectroscopic element is provided for reflecting the component scopic ray of the first predetermined wavelength from the first spectroscopic element toward the light outlet, the second spectroscopic element being disposed in the main light-conductive path between the light outlet and the first gap, and having the same reflection wavelength band as the first spectroscopic element. A first light-shielding means is provided for shutting off the component ray from the first spectroscopic element to the second spectroscopic element in accordance with the state of a second detection object.

Accordingly, an object of the present invention is to provide an optical switching unit which is effectively assembled in a unit for increased convenience and favorably permits an increase of the maximum value of the degree of wavelength multiplication, i.e., the number of applicable optical switches, in an optical transfer route for optical inspection system.

The above and further features, objects and advantages of the present invention will become apparent from the following detailed description of the preferred embodiments of the invention when read in conjunction with the accompanying drawings.

BRIEF DESCRIPTION OF THE DRAWING

FIG. 3 is a schematic view showing the constitution of an optical switching unit according to a second preferred embodiment of the present invention.

FIG. 4 is a schematic view of a modified example of the optical switching unit of FIG. 3.

FIGS. 5a and 5b are schematic views of conventional optical switches.

FIG. 6 is a schematic view of a conventional optical detection system.

DETAILED DESCRIPTION OF PREFERRED EMBODIMENTS

Figure 1:
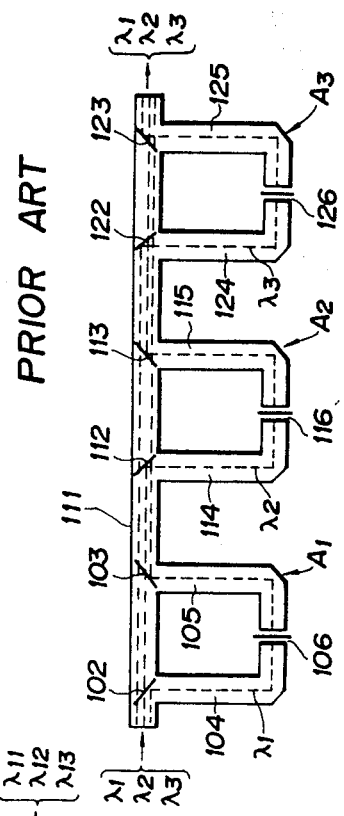
FIG. 1 is a schematic view showing the constitution of an optical switching unit according to a first preferred embodiment of the present invention.

Referring first to FIG. 1, designated at reference numeral 1 is an optical switching unit according to a first preferred embodiment of the present invention, the optical conductor portion of which is made of an optically conductive plastic material of such a size that the entirety thereof is accommodated within an area of approximately 2 cm square. The unit 1 comprises a straight-linear main light-conductive path 6 having a light inlet 2 optically connected to the light-source end of an optical detection system (not shown, except for the unit 1) and a light outlet 3 optically connected to the detection-element end of the detection system. A substantially U-shaped first light-conductive bypass 4 substantially perpendicularly branches at one end thereof from the main path 6 in the vicinity of the inlet 2 and again substantially perpendicularly joins at the other end thereof with the main path 6 in the vicinity of the outlet 2. A substantially U-shaped second light-conductive bypass 5 likewise branches from and joins with the main path 6 between the branching and joining points of the first bypass 4. Accordingly, the main path 6 has outer and inner pairs of branched portions which branch off to the first and second bypasses 4, 5, respectively. From a light source (not shown), a beam as a composite ray of light with a spectrum relative to wavelength ranging over first, second and third wavelength regions represented by characteristic wavelengths $\lambda_{11}$, $\lambda_{12}$, $\lambda_{13}$ ($\lambda_{11} > \lambda_{12} > \lambda_{13}$), respectively (as used herein, the term "wavelength" is assumed to be conceived as "a wavelength region characteristically represented by the wavelength" for the simplicity of description unless apparently otherwise perceivable from the context), is conducted to be axially let through the inlet 2 into the main path 6 and through the outlet 3 outwardly thereof. In the outer and inner branched portions of the main path 6, there are provided outer and inner pairs of spectroscopic elements 7, 10 and 8, 9 adapted to substantially completely reflect no more than particular component rays of light having wavelength $\lambda_{11}$ and wavelengths $\lambda_{11}$, $\lambda_{12}$, respectively. More particularly, the outer spectroscopic elements 7 and 10 reflect only the component ray of wavelength $\lambda_{11}$, as let to be incident thereupon from the inlet 2 and the outer bypass 4, to the bypass 4 and the outlet 3, respectively, thus functioning as a filter to admit the component rays of wavelengths $\lambda_{12}$, $\lambda_{13}$ to pass therethrough, while the inner elements 8 and 9 reflect the component rays of wavelengths $\lambda_{11}$, $\lambda_{12}$ (although in this embodiment the component ray of wavelength $\lambda_{11}$ is already eliminated at the element 7 from the composite beam), as let to be incident thereupon from the inlet 2 and the inner bypass 5, to the bypass 5 and the outlet 3, respectively, thus each being transparent to the component ray of wavelength $\lambda_{13}$.

In this respect, each of the spectroscopic elements 7, 10; 8,9 may comprise a dichroic mirror composed of a non-metallic multi-filmed interference filter fixed in the main path 6 by way of a vacuum evaporation, forming an incidence angle of 45° with respect to the beam of light in the main path 6.

The main path 6 and the bypasses 4, 5 comprise respective pairs of optical conductors designated again by reference numerals 6, 6 and 4, 4; 5, 5 facing each other in an end-to-end manner, with air gaps S1 and S2, S3 positioned in pairs therebetween, respectively, which gaps S1 and S2, S3 have their light-shielding plates 11, 12, and 13 each respectively insertable therein and withdrawable therefrom.

The light-shielding plates 11, 12, 13 are actuatable independently and are each respectively operatively connected to an actuation means (not shown) such as a solenoid-operated actuator under control of one of a plurality (which may be more than three under the provision of additional bypasses) objects to be simultaneously detected by the optical detection system. The system function concerned with such actuation of the light-shielding plates 11, 12, 13 is similar to that of the above-mentioned conventional optical switch, and is therefore now omitted.

Figure 2:
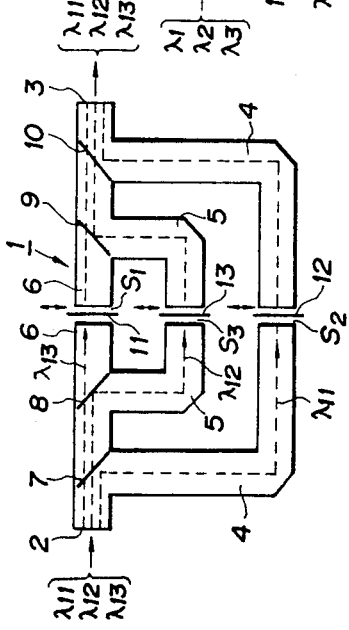
FIG. 2 is a graph showing the filtration characteristic of spectroscopic elements of the optical switching unit of FIG. 1.

FIG. 2 is a graph showing spectra of reflectance with respect to wavelength, for the outer and inner spectroscopic elements 7, 10; 8, 9, as well as for an imaginary additioal spectroscopic element provided in an imaginary additional light-conductive bypass (i.e. a third bypass), which may be preferably employed in a certain modified example, while the reflectance of each element is given in the term of a specific reflectance of a certain referency ray of light. There are also shown electromagnetic energy spectra of the component rays of light of wavelengths $\lambda_{11}$, $\lambda_{12}$, $\lambda_{13}$. In other words, FIG. 2 is a graph including spectral characteristic curves of filtration of the spectroscopic elements, given in terms of a specific reflectance.

In FIG. 2, designated at reference characters B11 and B12 are the characteristic curves of the elements 7, 10 and 8, 9, respectively, while B13 is that of the imaginary additional element.

With reference to FIGS. 1 and 2, there will be described hereinbelow the function of the optical switching unit 1.

The beam of light arranged through a collimator (not shown) and conducted to be let as a substantially straight composite ray of light into the light inlet 2 has the three component rays of wavelengths $\lambda_{11}$, $\lambda_{12}$, $\lambda_{13}$ separated by the spectroscopic elements 7, 8 as follows. First, by the outer element 7, only the component ray of wavelength $\lambda_{11}$ is reflected to be introduced into the outer light-conductive bypass 4. Then, because the ray of wavelength $\lambda_{11}$ is now eliminated from the remaining composite ray of light in the main light-conductive path 6, the inner element 8 reflects only the component ray of wavelength $\lambda_{12}$ into the inner light-conductive bypass 5. Accordingly, past the element 8, no more than the component ray of wavelength $\lambda_{13}$ advances straightly in the main path 6. As a result, the bypasses 4, 5 and the path 6 have therein the component rays of wavelengths $\lambda_{11}$, $\lambda_{12}$, $\lambda_{13}$ conducted therethrough, respectively. At the respective air gaps S1 and S2, S3 of the main path 6 and the bypasses 4, 5, where the respective light-shielding plates 11, 12, 13 have a particular combination of their on-off, i.e., retreat-forward positions, the rays of respective wavelengths $\lambda_{13}$ and $\lambda_{11}$, $\lambda_{12}$ are to be cut or passed according to the on-off positions of the plates 11, 12, 13, respectively, thereby carrying a particular signal state corresponding to the combination of the on-off positions.

Thereafter, by the spectroscopic elements 9 and 10, rays of wavelengths $\lambda_{12}$ and $\lambda_{11}$ are reflected to be conducted through the main path 6, respectively, thus again joining a ray of wavelength $\lambda_{13}$, thereby constituting a composite ray of light carrying the above-mentioned signal state, which composite ray leaves the main path 6 from the light outlet 3. More precisely, the ray of wavelength $\lambda_{12}$ from the inner bypass 5 is reflected by the inner element 9, to be led into the main path 6, and the ray of wavelength $\lambda_{11}$ from the outer bypass 4 is likewise reflected into the main path 6, while the ray of wavelength $\lambda_{13}$ is passed straightforwardly through the inner and outer elements 9, 10.

As is seen from the foregoing description, in the optical switching unit 1 according to the present invention, the main light-conductive path 6 and the light-conductive bypasses 4, 5 having the respective light-shielding plates S1 and S2, S3 are connected in parallel with respect to one another, while the outer and inner branched portions of the main path 6 as connection points thereof to the outer and inner bypasses 4, 5 are apparently arrayed in series along the main path 6. Such parallel connection successfully permits, when substantiating a necessary process for separating the composite rays of light into the respective component rays of wavelengths $\lambda_{11}$, $\lambda_{12}$, $\lambda_{13}$, a set of spectroscopic filters to include the inner element 8 as a second one in order of the array of elements, which second element, though being inherently adapted to cover the component ray of wavelength $\lambda_{12}$, has a filtering characteristic adapted to reflect the component ray of wavelength $\lambda_{11}$ as well. Such adaptation is favorably allowed by the arrangement of this embodiment, in which the ray of wavelength $\lambda_{11}$ is already reflected at the outer element 7 as a first element and does not reach the second element, so that the reflected ray of light at the second element includes no more than the ray of wavelength $\lambda_{12}$, even when the second element covers both wavelengths $\lambda_{11}$ and $\lambda_{12}$ as seen in the case of this embodiment. As a result, the second element is favorably permitted to have the spectrum B12 overlapping the spectrum B11 of the first element.

It will be understood that the foregoing explanation is applicable to the inner and outer elements 9, 10 near the light outlet 3.

Moreover, in the modified example with the additional light-conductive bypass, what the spectrum B13 of the additional elements of this third bypass has to the spectrum B12 of the inner elements 8, 9 may be set the same as the latter has to the spectrum B11 of the outer elements 7, 10.

Figure 7:
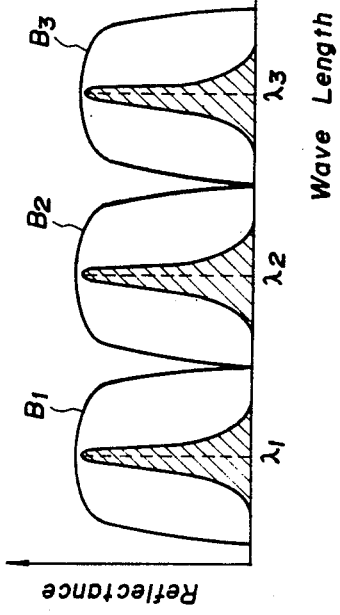
FIG. 7 is a schematic view of an optical switch portion of the optical detection system of FIG. 5b.

Namely, according to this embodiment, there is no need for isolating the boundary of reflectable wavelength band of any spectroscopic element from those of the neighboring elements with respect to a spectral field, whereas otherwise such isolation has been necessary as mentioned above in connection with the conventional optical switch of FIG. 7.

Therefore, according to this embodiment, when assuming respective optical conductor routes of an optical switching unit to be equal to the alotted wavelength band, the degree of multiplication of such conductor route will be favorably maximized, thus effectively permitting the number of optical switch elements to be maximized.

Figure 8:
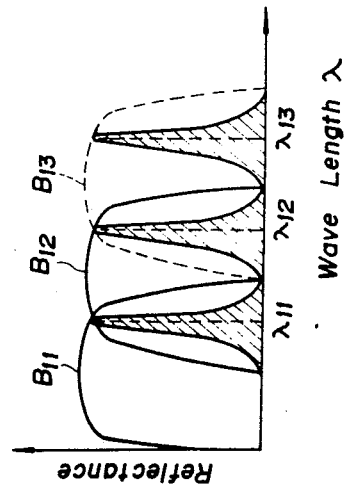
FIG. 8 is a graph showing the filtration characteristic of optical switches of the optical switch portion of FIG. 7.

In this respect, as will be easily understood, the number of light-conductive bypasses as well as the number of associated spectroscopic elements may be increased and decreased in accordance with the number of component rays of light as multiplied to, for example, four or two. Further, respective filtration characteristics of the spectroscopic elements may be such as shown in FIG. 8, as circumstances require.

Furthermore, the degree of freedom in the selection of filtration characteristic is permitted to rise favorably high, as seen from the description that the reflectable wavelength band of any spectroscopic element leading a particular component ray of light to an associated light-conductive bypass is allowed to overlap that of a preceding element with respect to the order in an array of such elements, i.e., to include the wavelength of a ray of light the preceding element has reflected to an associated bypass thereof.

Still more, for the component ray alloted to a main light-conductive path, no spectroscopic element is needed, thus effectively attaining a reduction in number of necessary component parts for each unit, thereby permitting a favorable cost reduction, which will become more comprehensive when comparing the example of this embodiment as shown in FIG. 1 with the conventional optical switch of FIG. 7, while their dimensions are quite different.

Further, according to this embodiment, the total length of optical conductor can be relatively reduced, thus effectively permitting a compact and light-weight design of the optical switching unit.

Referring now to FIG. 3, designated at reference numeral 51 is an optical switching unit according to a second preferred embodiment of the present invention, the optical conductor portion of which is made of an optically conductive plastic material of such a size that the entirety thereof is accomodated within an area of approximately 2 cm square. The unit 51 comprises a substantially U-shaped main light-conductive path 56 having a light inlet 52 optically connected to the light-source end of an optical detection system (not shown, except for the unit 51) and a light outlet 53 optically connected to the detection-element end of the detection system. A substantially straightforward first light-conductive bypass 54 substantially perpendicularly branches at one end thereof from the main path 56 in the vicinity of the inlet 52 and again substantially perpendicularly joins at the other end thereof with the main path 56 in the vicinity of the outlet 53, and a substantially straightforward second light-conductive bypass 55 likewise branches from the main path 56 between the branching point of the first bypass 54 and an inlet side corner of the main path 56 and joins with the main path 56 between the joining point of the first bypass 54 and an outlet side corner of the main path 56. Accordingly, the main path 56 has first and second pairs of branched portions at the connections to the first and second bypasses 54, 55, respectively. From a light source (not shown), a composite ray of light with a spectrum ranging over wavelength regions represented by characteristic wavelengths $\lambda_{11}$, $\lambda_{12}$, $\lambda_{13}$, respectively, is conducted to be let through the inlet 52 into the main path 56 and through the outlet 53 outwardly thereof. In the first and second branched portions of the main path 56, there are provided first and second pairs of spectroscopic elements 57, 60 and 58, 59 adapted to reflect no more than particular component rays of light having wavelength $\lambda_{11}$ and wavelengths $\lambda_{11}$, $\lambda_{12}$, respectively.

In this respect, each of the spectroscopic elements 57, 60; 58, 59 may comprise a dichroic mirror fixed in the main path 56 by way of a vacuum evaporation, forming an incidence angle of 45° with respect to the beam of light in the main path 56.

The main path 56 and the bypasses 54, 55 have in their intermediate portions respective air gaps S11, S12, and S13 provided with their light-shielding plates 61, 62, and 63 each respectively insertable therein and withdrawable therefrom.

The function of the optical switching unit 51 is substantially the same as that of the above-mentioned switching unit 1 of FIG. 1, and is therefore now omitted. The difference therebetween resides in that, contrary to the unit 1 in which the incoming composite ray of light has the same advancing direction as the outgoing composite ray of light, the unit 51 has an outgoing ray thereof angularly displaced by 180° relative to an incoming ray thereof.

Therefore, according to this second embodiment, there is favorably overcome the conventional difficulty of reversing the path of light within a very small confined detection space, which difficulty is due to the unavoidable limit of flexibility of optical cable.

It will be understood that the second embodiment can provide the same advantages as the first embodiment.

Moreover, in the switching unit 51, in which the light-conductive bypasses 54, 55 are formed substantially straight, an effective reduction of size is attained by substituting air gaps for such straight portions of the bypasses 54, 55.

Such substitution of air gaps for optical conductor is successfully embodied in a modified example of the second embodiment illustratively shown in FIG. 4.

Referring now to FIG. 4, designated at reference numeral 81 is an optical switching unit according to the modified example mentioned above, the optical conductor portion of which is made of an optically conductive plastic material by of such a size that the entirety thereof is accommodated within an area of approx. 2 cm square. The unit 81 comprises a tuning fork-like or width-narrowed U-shaped main light-conductive path 86 having a light inlet 82 optically connected to the light-source end of an optical detection system (not shown, except for the unit 81) and a light outlet 83 optically connected to the detection-element end of the detection system. The main path 86 has at the base part thereof an air gap S21 formed therethrough and provided with a light-shielding plate 91 insertable therein and withdrawable therefrom. In the main path 86, in order from the inlet 82 and outlet 83 toward the air gap S21, there are provided first and second pairs of spectroscopic elements 87, 90 and 88, 89 fixed by way of a vacuum evaporation, forming an incidence angle of 45° with respect to a corresponding incident ray of light. From a composite ray of light from a light source (not shown), which consists of three component rays of wavelengths $\lambda_{11}$, $\lambda_{12}$, $\lambda_{13}$, the first and second elements 87, 90 and 88, 89 selectively reflect the component rays of wavelengths $\lambda_{11}$, $\lambda_{12}$ from the main path 86 into the bypasses 84, 85 as well as from the bypasses 84, 85 into the main path 86, thus functioning as a spectroscopic filter. Between the first elements 87, 90 and between the second elements 88, 90, the main path 86 has formed therethrough air gaps S22 and S23, respectively, provided with respective light-shielding plates 92, 93 insertable therein and withdrawable therefrom.

The optical switching unit 81 provides, in addition to the advantages attained by the switching unit of FIG. 3, the possibility of saving the optically conductive plastic material by a portion corresponding to light-conductive bypasses otherwise required, as well as of rendering the unit size compact by a degree corresponding to the elimination of such bypasses.

According to the present invention, an optical switching unit as applied to a multiplied optical communication system for small-sized vehicles favorably contributes, as seen from the geometrical nature thereof, to the simplification of the system.

Although there have been described what are at present considered to be the preferred embodiments of the invention, it will be understood that the present invention may be embodied in other specific forms without departing from the spirit or essential characteristics thereof. The present embodiments are therefore to be considered in all respects as illustrative and not restrictive. The scope of the invention is indicated by the appended claims rather than by the foregoing description.

We claim:
1. An optical switching unit, comprising:
a main light-conductive path having a light inlet for intaking a composite ray of light consisting of a plurality of component rays of predetermined wavelengths from a light source, and a light outlet for outputting said composite ray;
said main light-conductive path having a first gap formed in the route thereof;
said first gap dividing said main light-conductive path;
a first light-shielding member adapted to be actuated by actuation means to be inserted in said first gap in accordance with the state of a first detection object;
a first spectroscopic element for reflecting a component ray of a first predetermined wavelength in said composite ray;
said first spectroscopic element being disposed in said main light-conductive path between said light inlet and said first gap;
said first spectroscopic element having a first reflection wavelength band including said first predetermined wavelength;
a second spectroscopic element for reflecting said component ray of said first predetermined wavelength from said first spectroscopic element toward said light outlet;
said second spectroscopic element being disposed in said main light-conductive path between said light outlet and said first gap;
said second spectroscopic element having the same reflection wavelength band as said second spectroscopic element; and
first light-shielding means for shutting off said component ray from said first spectroscopic element to said second spectroscopic element in accordance with the state of a second detection object.

2. An optical switching unit according to claim 1, further comprising:
at least one third spectroscopic element for reflecting a component ray of a second predetermined wavelength in said composite ray;
said third spectroscopic element being disposed in said main light-conductive path between said first spectroscopic element and said first gap;
said third spectroscopic element having a second reflection wavelength band including said second predetermined wavelength;
a fourth spectroscopic element for reflecting said component ray of said second predetermined wavelength from said third spectroscopic element toward said light outlet;
said fourth spectroscopic element being disposed in said main light-conductive path between said second spectroscopic element and said first gap;
said fourth spectroscopic element having the same reflection wavelength band as said third spectroscopic element; and
second light-shielding means for shutting off said component ray from said third spectroscopic element to said fourth spectroscopic element in accordance with the state of a third detection object.

3. An optical switching unit according to claim 2, wherein:
said first light-shielding means comprises a first light-conductive bypass connecting a portion of said main light-conductive path where said first spectroscopic element is disposed to another portion thereof where said second spectroscopic element is disposed, said first light-conductive bypass having a second gap formed therein, said second gap dividing said first light-conductive bypass, and a second light-shielding member adapted to be actuated to be inserted in said second gap by actuation means in accordance with the state of said second detection object; and said second light-shielding means comprises a second light-conductive bypass connecting a portion of said main light-conductive path where said third spectroscopic element is disposed to another portion thereof where said fourth spectroscopic element is disposed, said second light-conductive bypass having a third gap formed therein, said third gap dividing said second light-conductive bypass, and a third light-shielding member adapted to be actuated to be inserted in said third gap by actuation means in accordance with the state of said third detection object.

4. An optical switching unit according to claim 3, wherein: said main light-conductive path has a substantially straight linear configuration.

5. An optical switching unit according to claim 3, wherein: said main light-conductive path has a substantially U-shaped configuration.

6. An optical switching unit according to claim 2, wherein: said main light-conductive path has a width-narrowed U-shaped configuration;

said first spectroscopic element and said second spectroscopic element are disposed in said main light-conductive path at points opposing each other;

said first light-shielding means comprises a second light-shielding member actuated by actuation means driven in accordance with the state of said second detection object, to be inserted into and withdrawn from a gap formed between said first spectroscopic element and said second spectroscopic element;

said third spectroscopic element and said fourth spectroscopic element are disposed in said main light-conductive path at points opposing each other; and said second light-shielding means comprises a third light-shielding member actuated by actuation means driven in accordance with the state of said third detection object, to be inserted into and withdrawn from a gap formed between said third spectroscopic element and said fourth spectroscopic element.

7. An optical switching unit according to claim 2, wherein: said first reflection wavelength band has no portion thereof overlapped with any portion of said second reflection wavelength band.

8. An optical switching unit according to claim 2, wherein: said first reflection wavelength band and said second reflection wavelength band are partially overlapped with each other.

9. An optical switching unit according to claim 2, wherein; each of said spectroscopic elements comprises a dichroic mirror.

10. An optical switching unit according to claim 2, wherein: said main light-conductive path comprises an optically conductive plastic material.

11. An optical switching unit according to claim 3, wherein: each of said first and second light-conductive bypasses comprises an optically light-conductive plastic material.

12. An optical switching unit according to claim 2, wherein:

said unit is of a size substantially accommodated within a 2 cm square.

* * * * *

UNITED STATES PATENT AND TRADEMARK OFFICE
CERTIFICATE OF CORRECTION

PATENT NO. : 4,707,057
DATED : November 17, 1987
INVENTOR(S) : Takahashi et al.

It is certified that error appears in the above-identified patent and that said Letters Patent is hereby corrected as shown below:

```
Column 1, line 52, after "shown" insert --in--.
Column 2, line 4, after "condition" insert --of the--;
          line 7, change "electronic" to --electric--;
          line 13, change "accompany" to --accompanying--.
Column 3, line 39, after "words," insert --in--.
Column 4, line 31, change "system" to --systems--;
          line 38, change "DRAWING" to --DRAWINGS--.
Column 5, line 11, after "outlet" change "2" to --3--;
          line 66, before "objects" insert --of--.
Column 6, line 7, change "additioal" to --additional--;
          line 12, change "referency" to --reference--.
Column 7, line 66, change "alloted" to --allotted--.
Column 8, line 16, change "accomodated" to --accommodated--.
Column 9, line 18, after "material" delete "by".
Column 10, line 33 (claim 10, line 32), after "as said"
change "second" to --first--.
```

Signed and Sealed this

Fifth Day of April, 1988

*Attest:*

DONALD J. QUIGG

*Attesting Officer*     *Commissioner of Patents and Trademarks*